United States Patent
Shinada et al.

(10) Patent No.: US 7,306,105 B2
(45) Date of Patent: Dec. 11, 2007

(54) COMPOSITE POROUS MEMBRANE AND METHOD FOR PRODUCING THE SAME

(75) Inventors: Katsuhiko Shinada, Hiroshima-ken (JP); Kei Murase, Hiroshima-ken (JP); Teruyuki Yamada, Hiroshima-ken (JP); Yuuichi Shirasu, Hiroshima-ken (JP); Masahiko Mizuta, Hiroshima-ken (JP); Hiroyuki Fujiki, Hiroshima-ken (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 11/125,179

(22) Filed: May 10, 2005

(65) Prior Publication Data

US 2005/0205488 A1 Sep. 22, 2005

Related U.S. Application Data

(63) Continuation of application No. PCT/JP03/14262, filed on Nov. 10, 2003.

(30) Foreign Application Priority Data

Nov. 12, 2002 (JP) .............................. 2002-328085
Jul. 10, 2003 (JP) .............................. 2003-194892

(51) Int. Cl.
*B01D 69/12* (2006.01)
*B01D 69/10* (2006.01)
*B01D 29/00* (2006.01)

(52) U.S. Cl. ...................... 210/483; 210/488; 210/489; 210/490; 210/500.21

(58) Field of Classification Search ................ 210/483, 210/488, 489, 490, 500.21

See application file for complete search history.

(56) References Cited

U.S. PATENT DOCUMENTS

| 4,061,821 | A | 12/1977 | Hayano et al. |
| 5,242,636 | A | 9/1993 | Sluma et al. |
| 5,472,607 | A | 12/1995 | Mailvaganam et al. |
| 5,914,039 | A | 6/1999 | Mahendran et al. |
| 5,914,939 | A | 6/1999 | Serkowski |
| 6,284,137 | B1 * | 9/2001 | Hajikano et al. ...... 210/500.41 |
| 6,354,444 | B1 * | 3/2002 | Mahendran et al. ........ 210/490 |
| 2003/0134550 | A1 * | 7/2003 | Lee et al. ..................... 442/59 |
| 2006/0000766 | A1 * | 1/2006 | Ji ......................... 210/500.27 |

FOREIGN PATENT DOCUMENTS

| JP | 52-81076 A | 7/1977 |
| JP | 52-082682 A | 7/1977 |
| JP | 52-120288 A | 10/1977 |
| JP | 53-132478 A | 11/1978 |
| JP | 60-51363 B | 11/1985 |
| JP | 2003-311133 A | 11/2003 |
| WO | WO 99/01207 A1 | 1/1999 |

* cited by examiner

*Primary Examiner*—John Kim
(74) *Attorney, Agent, or Firm*—Kendrew H. Colton; Fitch, Even, Tabin & Flannery

(57) ABSTRACT

An object of the present invention is to provide a composite porous membrane, which has not only excellent filtration capacity, but also excellent adhesion between a porous membrane and a braid and mechanical properties, and a method for producing the composite porous membrane. The present invention relates to a composite porous membrane comprising a braid, and a membrane material; wherein the membrane material comprises a first porous layer comprising a dense layer which is arranged on the outer surface of the braid, and a second porous layer comprising a dense layer which is arranged on the first porous layer, and a method for producing the composite porous membrane.

8 Claims, 1 Drawing Sheet

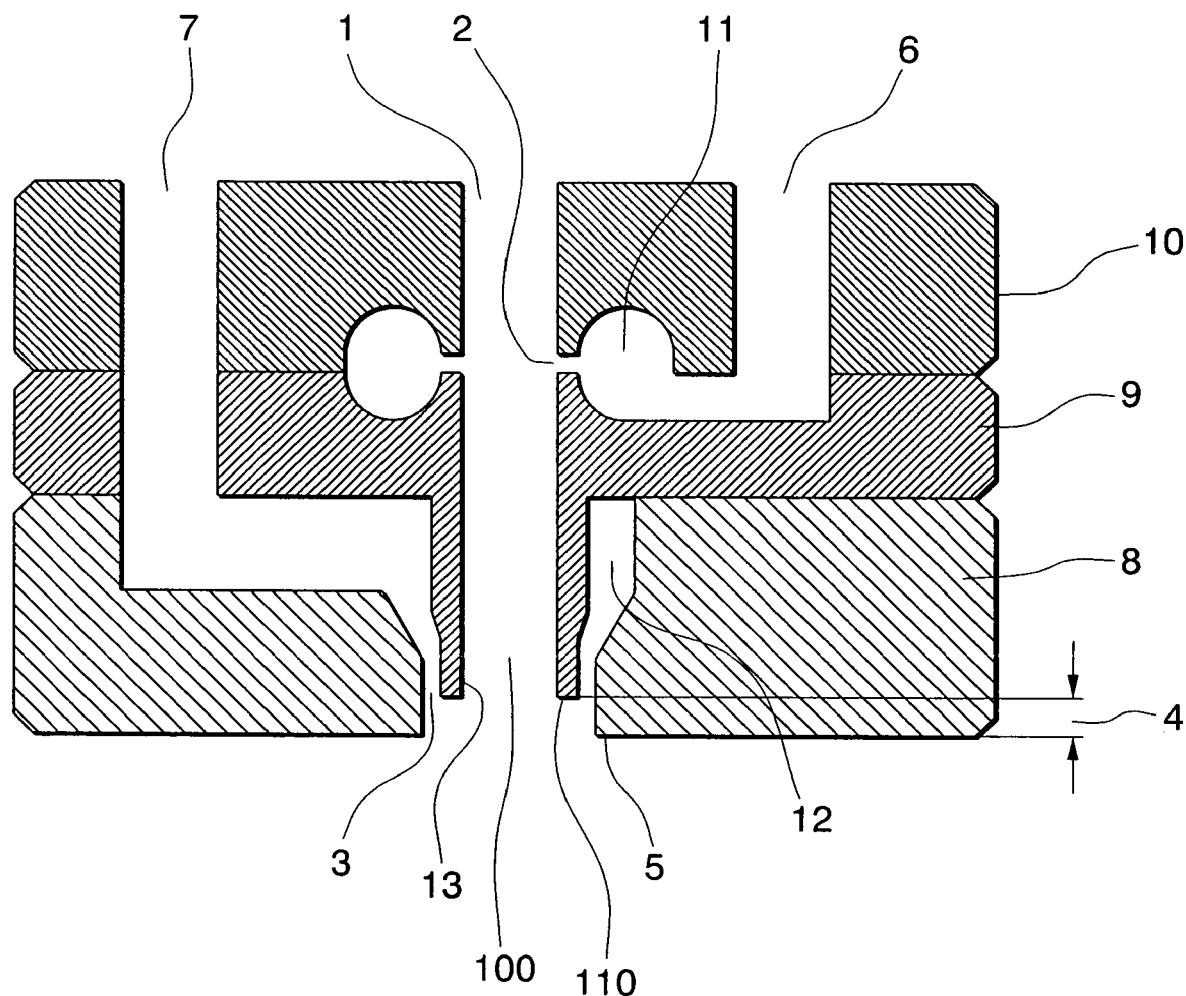

COMPOSITE POROUS MEMBRANE AND METHOD FOR PRODUCING THE SAME

This Application is a Rule 1.53(b) Continuation Application of PCT/JP03/14262 filed Nov. 10, 2003, and claims the priority from Japanese Application No. 2003-194892, filed Jul. 10, 2003, and from Japanese Application No. 2002-328085, filed Nov. 12, 2002, the complete disclosure of each of the foregoing applications is incorporated herein by reference.

TECHNICAL FIELD

The present invention relates to a composite porous membrane, which is suitable for water treatment, as a micro-filtration membrane or an ultra-filtration membrane, and to a method for producing the composite porous membrane.

BACKGROUND ART

Recently, water treatment in a membrane method, which uses a filtration membrane which is excellent in separation ability and compactness, is drawing attention in view of increasing interest in environmental pollution and tightening of regulations. In order to use in such water treatment, a filtration membrane is demanding to have not only excellent separation property and permeation capacity, but also mechanical properties which are higher than those of ordinal filtration membranes.

As conventional filtration membranes having excellent permeation capacity, filtration membranes made of polysulfone, polyacrylonitrile, cellulose acetate, polyvinylidene fluoride, and the like, which are produced by a wet spinning method or a dry and wet spinning method, have been known. These filtration membranes are produced by micro-phase separation of a polymer solution and solidification of the polymer solution in a non-solvent. These filtration membranes comprise a dense layer and a support layer, and they have high pore ratio and an asymmetrical structure.

Among materials for these filtration membranes, polyvinylidene fluoride resin is suitably used for material of a separation membrane, since it has excellent chemical resistance and heat resistance. However, there is a problem that a filtration membrane made by polyvinylidene fluoride hollow fiber membrane has inferior mechanical strength.

A porous membrane in which hollow braids are entirely embedded in a porous semipermeable membrane has been suggested as a membrane having improved strength. (Japanese Unexamined Patent Applications, First Publication Nos. S52-081076, S52-082682, and S52-120288). However, since the braids are entirely embedded in the porous semipermeable membrane, this porous membrane has a problem in water permeation capacity.

In order to improve water permeation capacity, a separation membrane, in which a porous membrane is provided on the surface of hollow braids, has been suggested (U.S. Pat. No. 5,472,607). However, since this separation membrane has a porous membrane only on the surface of the braids, this has a problem that the porous membrane is easily peeled from the braids.

In consideration of the above-described problems, an object of the present invention is to provide a composite porous membrane, which has not only excellent filtration capacity, but also excellent adhesion between a porous membrane and a braid and mechanical properties, and a method for producing the composite porous membrane.

DISCLOSURE OF THE INVENTION

The present invention provides a composite porous membrane comprising a braid, and a membrane material; wherein the membrane material comprises a first porous layer comprising a dense layer which is arranged on the outer surface of the braid, and a second porous layer comprising a dense layer which is arranged on the first porous layer.

It is preferable that the composite porous membrane be a porous hollow fiber membrane which is obtained by coating the membrane material on the braid. When the composite porous membrane is used for water treatment, it is necessary to make liquid at the first side flow relative to the surface of the membrane. Due to the flow relative to the surface of the membrane, the membrane vibrates and is strained; therefore, the membrane is required to have sufficient mechanical strength. Since the braids have sufficient mechanical strength, the composite porous membrane of the present invention has sufficient mechanical strength.

Since the composite porous membrane of the present invention comprises the membrane material comprising two or more dense layers, the composite porous membrane has improved durability.

In addition, the present invention provides a method for producing a composite porous membrane comprising the steps of: coating a membrane forming solution on a braid using a ring nozzle; solidifying the coated membrane forming solution in a solidification solution to produce a first porous layer; coating another membrane forming solution on the surface of the first porous layer using the ring nozzle; and solidifying the coated membrane forming solution in a solidification solution to produce a second porous layer.

BRIEF DESCRIPTION OF THE DRAWINGS

FIG. 1 is a cross-sectional view showing one embodiment of a ring nozzle used in the method for producing a composite porous membrane of the present invention.

BEST MODE FOR CARRYING OUT THE INVENTION

The preferred embodiments of the present invention are explained below.

The composite porous membrane of the present invention comprises a braid and a membrane material, wherein the membrane material comprises a first porous layer comprising a dense layer which is arranged on the outer surface of the braid, and a second porous layer comprising a dense layer which is arranged on the first porous layer.

Below, the braid used in the composite porous membrane of the present invention is explained in detail.

It is preferable that yarn composing the braid used in the present invention be multifilament, monofilament, or spun yarn. In addition, the cross-sectional shape of the yarn is preferably a round shape, hollow, or an irregular shape.

In the case of using multifilament for the braid, a multifilament having a filament number in a range of 30 to 200 is preferable, because it has excellent strength and water permeation capacity. When the number of filament is less than 30, the deform pressure of the multifilament decreases. In contrast, when it exceeds 200, there is a probability that water permeation capacity may be degraded due to decrease of the inner diameter.

Examples of the materials of the braid include synthetic fiber, semi-synthetic fiber, regenerated fiber, natural fiber, and inorganic fiber. They can be used individually or in combination of two or more thereof.

Examples of the synthetic fiber include polyamide fibers such as nylon 6, nylon 66, and aromatic polyamides fiber; polyester fibers such as polyethylene terephthalate, polybutylene terephthalate, poly lactic acid, and poly glycol acid fibers; acrylic fibers such as polyacrylonitrile fiber; polyolefine fibers such as polyethylene and polypropylene fibers; polyvinyl alcohol fibers; polyvinylidene chloride fibers; polyvinyl chloride fibers; polyurethane fibers; phenolic fibers; fluororesin fibers such as polyvinylidene fluoride and polytetrafluoroethylene fibers; polyalkylene paraoxybenzoate fibers; and the like.

Examples of the semi-synthetic fiber include cellulose derivative fibers such as cellulose diacetate, cellulose triacetate, chitin, and chitosan fibers; protein fibers such as so-called promix; and the like.

Examples of the regenerated fibers include regenerated cellulose fibers produced by viscose method, copper-ammonia method, or organic solvent method, specifically include rayon fiber, cupro fiber, and polynosic fiber.

Examples of the natural fiber include flax, jute fibers, and the like.

Examples of the inorganic fiber include glass, carbon, and metal fibers, and the like.

Among these, a fiber comprising at least one of polyester fibers, acrylic fibers, polyvinyl alcohol fibers, polyamide fibers, and polyolefin fibers is preferable, because it has excellent chemical resistance. In particular, polyester fibers and acrylic fibers are more preferable.

From the viewpoint of improving durability and adhesion of the membrane, the fineness of the braid is preferably in a range of 500 to 1,200 dtx. When the fineness of the braid is less than 500 dtx, the deform pressure of the membrane decreases. In contrast, when the fineness of the braid exceeds 1,200 dtx, there is a probability that water permeability may decreases due to decrease of the inner diameter of the braid.

In addition, from the viewpoint of improving durability and water permeability of the membrane, it is preferable that a number of spindles of the braid be in a range of 8 to 50. When the number of spindles is less than 8, the deform pressure decreases. In contrast, when it exceeds 50, there is a probability that water permeability may decreases due to decrease of the inner diameter of the braid.

It is preferable that a degree of fuzz be 15 or less per 1 meter. When the degree of fuzz exceeds 15 per 1 meter, defective coated portions are easily generated, and bacteria such as colibacillus and suspended matter permeate, and it is not suitable for practical use. The degree of fuzz per 1 m of the braid is more preferably 10 or less, and much more preferably 5 or less.

Here the term "fuzz" denotes a fiber which protrudes from the braid loosely or by cut of the woven fibers comprising the braid, matter in a fiber shape which is other than fibers comprising the braid and which protrudes from the braid, and foreign substances which have a shape other than fiber and which protrude from the braid.

From the viewpoint of improving an impregnation percentage of resin contained in the membrane material to the braid, hot water shrinkage percentage of the braid is preferably be 5% or less, more preferably 4% or less, and much more preferably 3% or less. When hot water shrinkage percentage exceeds 5%, during a hot water washing process, which is one process of production, the braid shrinks remarkably. When the braid shrinks remarkably, the first porous layer, which is impregnated into the braid, also shrinks. In contrast, since the second porous layer is not completely adhered to the first porous layer, the second porous layer does not shrink remarkably (details are explained below). Due to this, the gap between the first porous layer and the second porous layer increase, and resin does not readily impregnate due to the gap.

Tension applied to the braid influences stability in forming membrane process and impregnation property of fixation resin. In order to improve them, it is preferable that tension applied to the braid be in a range of 1 kPa to 30 kPa. When tension applied to the braid is less than 1 kPa, problems such as the braid is off from a guide during production processes tend to easily happen. When tension applied to the braid exceeds 30 kPa, the braid and the first porous layer tend to be finer, and the deform degree thereof tends to be larger, but the second porous layer does not deform remarkably. Due to this, the gap between the first porous layer and the second porous layer tends to be large. Tension applied to the braid is more preferably in a range of 3 kPa to 25 kPa, and much more preferably in a range of 5 kPa to 20 kPa. Moreover, tension applied to the braid can be measured by measuring pressure applied to a part of the braid before introducing in a ring nozzle using a tension meter.

As the braid, for example, a braid, which is produced by knitting or weaving 16 of polyester fibers—96 filaments having 8.6 dtex or multifilament having a total 830 dtex using a machine with a rate of 10 revolutions/min, can be used.

Next, the membrane material is explained.

The membrane material comprises a first porous layer provided with a dense layer adjacent to the outer surface of the braid, and a second porous layer provided with a dense layer adjacent to the first porous layer.

From the viewpoint of achieving sufficient filtration capacity, the membrane material has preferably many pores which pass through the membrane material and connect between one surface and another surface of the membrane. The pores of the membrane material may be pores, which pass straight through the membrane material, or have a net structure, that is, the pore may be complicated in the membrane material.

From the viewpoint of improving chemical resistance and heat resistance, it is preferable that the membrane material be formed by fluororesins. Among fluororesins, polyvinylidene fluoride is more preferable. It is preferable that the polyvinylidene fluoride contain polyvinylidene fluoride (A) having a weight average molecular weight of 100,000 to 1,000,000 and polyvinylidene fluoride (B) having a weight average molecular weight of 10,000 to 500,000 and that a mass ratio of the polyvinylidene fluoride (A) to the polyvinylidene fluoride (B) ((A)/(B)) be in a range of 0.5 to 10. It is more preferable that the ratio be in a range of 1 to 3. By adjusting the ratio in such a range, a pore diameter in the membrane can be easily adjusted.

When the thickness of the membrane material is too thick, the water permeability decreases. In contrast, when it is too thin, the membrane may be easily damaged. Therefore, the thickness of the membrane material, specifically, the thickness from the most inner surface to the most outer surface of the membrane material is preferably in a range of 200 µm to 500 µm.

When the first and second porous layers are adhered such that the outer surface of the first porous layer is adhered to the inner surface of the second porous layer, strength of the composite porous membrane increases. However, when the first and second porous layers are adhered completely, water permeability decreases. Therefore, it is preferable that 1 to 50% of the interface area of the both layers relative to 100% of the interface area is adhered.

From the viewpoint of adjusting both of water permeation capacity and fractional pore diameter, it is preferable that the first porous layer have a dense layer having an average pore diameter in a range of 0.2 to 1 μm. It is also preferable that the second porous layer have a dense layer having an average pore diameter in a range of 0.1 to 0.8 μm.

The thickness of the dense layer is preferably in a range of 50 nm to 50 μm, more preferably in a range of 200 nm to 30 μm, and much more preferably in a range of 500 nm to 10 μm.

From the viewpoint of adjusting both of water permeation capacity and fractional pore diameter, it is preferable that at least one of the first and second porous layers have the dense layer at a position which is inside from the outermost surface of the membrane at a range of 0.1 μm to 50 μm. The membrane which has the dense layer at position where is inside from the surface of the membrane at less than 0.1 μm is not preferable, because when it is shocked from the outside, or has a problem in adhesion between membranes during a production process and the like, it is easily damaged. In contrast, when the dense layer is formed at position where is inside from the surface of the membrane at 50 μm or greater, membrane performance does not decrease, but it is sufficient that the dense layer be formed at a position which is inside from the surface of the membrane at 50 μm in practical use.

In order to improve water permeability, it is preferable that at least one of the first and second porous layers have a support layer which comprises pores having diameters increasing gradually from a side of the dense layer to a side of the braid. By adoption of such inclination structure, when the thickness of the membrane increases, high water permeation capacity can be maintained.

The support layer may contain macro-voids having a diameter in a range of 50 μm to 150 μm. The diameter of the pores other than the macro-voids is preferably in a range of 0.1 μm to 50 μm, more preferably in a range of 0.3 μm to 30 μm, and much more preferably in a range of 0.5 μm to 20 μm.

In addition, the average diameter of the pores at the outermost position in the first porous layer is preferably in a range of 1 μm to 5 μm, and that of the pores at the outermost position in the second porous layer is preferably in a range of 0.8 μm to 2 μm.

Here, the outermost position of the first porous layer denotes a position of an interface between the first and second porous layers. The outermost position of the second porous layer denotes a position of the outermost surface of the second porous layer when the second porous layer is the outermost of the membrane. When the membrane comprises another porous layer on the surface of the second porous layer, the outermost position of the second porous layer denotes a position of an interface between the second and another porous layer.

Below, the composite porous membrane comprising the braid and the membrane material is explained.

The thickness of the entire composite porous membrane is preferably in a range of 600 μm to 1,200 μm, in the case in which water permeability and strength to deform are taken into consideration. When the outer diameter of the composite porous membrane is too large, the membrane area per unit volume decreases. In contrast, when the outer diameter is smaller, the diameter of the hollow part is thinner, and resistance to water permeation increases. Therefore, it is preferable that the outer diameter of the composite porous membrane be in a range of 2,000 μm to 5,000 μm, and the inner diameter thereof be in a range of 700 μm to 3,000 μm.

From the viewpoint of achieving sufficient filtration capacity, the water permeate flow (WF) of the composite porous membrane is preferably 50 ($m^3/m^2/h/MPa$) or greater. When the water permeate flow of the composite porous membrane is less than 50 ($m^3/m^2/h/MPa$), the composite porous membrane has inferior filtration capacity, and is not for practical use. There is no upper limitation to filtration capacity, but the water permeate flow of 400 ($m^3/m^2/h/MPa$) is sufficient for practical use.

It is preferable that the bubble point (BP) of the composite porous layer be preferably 50 (kPa) or greater. When the bubble point is less than 50 kPa, bacteria such as colibacillus and suspended matter permeate, and it is not suitable for practical use.

From the viewpoint of adjusting both of water permeation capacity and fractional pore diameter, it is preferable that the bursting pressure by flow of the composite porous membrane be 200 kPa or greater. When the bursting pressure by flow is less than 200 kPa, bacteria such as colibacillus and suspended matter permeate, and it is not suitable for practical use. There is no upper limitation, but the bursting pressure by flowing of 1,000 kPa is sufficient for practical use.

From the viewpoint of adjusting both of water permeation capacity and fractional pore diameter, it is preferable that when water successively passes through the composite porous membrane at 200 kPa, the endurance period be 150 hours or greater. When the endurance period is less than 150 hours, bacteria such as colibacillus and suspended matter permeate, and it is not suitable for practical use. There is no upper limitation for the endurance period, but the endurance period of 10,000 hours is sufficient for practical use. Here, the endurance period denotes the time which the composite porous membrane maintains frictional capacity before flowing.

In addition, it is preferable that the endurance time of applying pressure of 400 kPa to the composite porous membrane repeatedly be 100 or more. When the endurance time of applying pressure or 400 kPa is less than 100, bacteria such as colibacillus and suspended matter permeate, and it is not suitable for practical use. There is no upper limitation for the endurance time, but the duration time of 10,000 is sufficient for practical use. Here, the endurance time denotes the time which the composite porous membrane maintains frictional capacity before applying pressure.

Next, production methods for the composite porous membrane having the abovementioned properties are explained.

In order to produce the composite porous membrane of the present invention, it is preferable to use a so-called wet spinning method. Specifically, it is preferable to discharge a membrane forming solution from a ring nozzle, free-running at a fixed time, immersing the membrane in a solidification solution, and thereby a porous membrane material is produced. In order to produce a membrane, first the braid is made to pass through the ring nozzle, and then the membrane forming solution coats the braid.

The method for producing a composite porous membrane of the present invention is a method comprising the steps of: coating a membrane forming solution on a braid using a ring nozzle; solidifying the coated membrane forming solution in a solidification solution to produce the first porous layer; and coating another membrane forming solution on the surface of the first porous layer using the ring nozzle; and solidifying the coated membrane forming solution in a solidification solution to produce the second porous layer.

In order to form the first porous layer on the braid, a first membrane forming solution, which easily impregnates in the braid, coats the braid, then a second membrane forming solution, which is suitable for forming a porous layer and which is concentrated than the first membrane forming solution, coats the resulting braid. By using the first and second membrane forming solutions having different concentrations, the membrane forming solution impregnates a main portion of the braid and peeling of the membrane material from the braid is prevented.

When impregnation property to the braid is concerned, a concentration of polymer in the first membrane forming solution, which forms the membrane material, is preferably 12% or less, more preferably 10% or less, and much more preferably 7% or less. The first membrane forming solution easily impregnates in the braid by adjusting polymer concentration to the range. In addition, when the composite porous membrane is formed, a polymer concentration of the membrane material in voids in the braid is similar to the polymer concentration of the first membrane forming material; therefore, water permeability of the membrane during filtration can be maintained at a high level. In addition, the membrane material is adhered to the braid with sufficient adhesive strength.

Similarly to the first membrane forming solution, a solution, in which polymer, which becomes the membrane material, is dissolved in a solvent, is used as the second membrane forming solution. In order to prevent the generation of a void layer and obtain sufficient mechanical strength of the composite porous membrane, it is preferable that the second membrane forming solution have a polymer concentration, which is larger than the polymer concentration of the first membrane forming solution. Specifically, the concentration of polymer in the second membrane forming solution, which forms the membrane material, is preferably 12% or greater, and more preferably 15% or greater. In order to increase permeation flow quantity, in general, the polymer concentration is preferably 25% or less.

The solvent of the first and second membrane forming solutions is preferably an organic solvent. Examples of the organic solvent include dimethyl formamide, dimethyl acetamide, and dimethy sulfoxide. Among these, dimethyl acetamide is preferable, because it provides a porous member having high permeation flow quantity.

In addition, it is preferable to dissolve hydrophilic polymer, for example, monools such as polyethylene glycol, diols, triols, and polyvinyl pyrolidone in the first and second membrane forming solutions as an additive for controlling phrase separation. The lower limit of the concentration of hydrophilic polymer is preferably 1% by mass, and more preferably 5% by mass. The upper limit of the concentration of hydrophilic polymer is preferably 20% by mass, and more preferably 12% by mass.

If the temperature of the forming membrane solutions when they are discharged from the nozzle, is less than 20° C., there is a probability that the membrane forming solution is gelled at low temperatures. In contrast, when the temperature exceeds 40° C., adjusting the pore diameter is difficult, and this result causes permeation of bacteria such as colibacillus and suspended matter, and it is not suitable for practical use. Therefore, the temperature of the membrane forming solution is in a range of 20° C. to 40° C.

After that, after free-running the membrane forming solution coated on the braid, it is immersed in a solidification solution to produce the first porous layer.

When the free-running time is less than 0.01 second, filtration capacity decreases. There is no upper limitation for the free-running time, but 4 seconds is sufficient for practical use. Therefore, the free-running time is preferably in a range of 0.01 second to 4 seconds.

As the solidification solution, an aqueous solution, which contains the solvent used for the membrane forming solvent, is preferably used. Depending on kinds of solvents used, for example, when dimethyl acetamide is used as the solvent of the membrane forming solution, the concentration of dimethyl acetamide in the solidification solution is preferably in a range of 1% to 50%.

From the viewpoint of improving mechanical strength, the temperature of the solidification solution is preferably low. However, when the temperature is too low, permeation flow quantity of the resulting membrane decreases; therefore, the temperature of the solidification solution is generally 90° C. or less, and preferably in a range of 50° C. to 85° C.

After solidification, it is preferable that the solvent be washed in hot water in a range of 60° C. to 100° C. It is effective to adjust the temperature of a washing bath to high temperature as possible in a range of the first porous layers are not melted and adhered. From this viewpoint, the temperature of the washing bath is preferably 60° C. or greater.

It also preferable that after hot water washing, chemical washing using hypochlorous acid and the like be performed. When hypochlorous acid is used, the concentration is preferably in a range of 10 mg/L to 120,000 mg/L. When the concentration of hypochlorous acid is less than 10 mg/L, the permeation flow quantity of the resulting membrane decreases. There is no upper limitation for the concentration of hypochlorous acid, but 120,000 mg/L is sufficient for practical use.

After that, it is preferable that the membrane after chemical washing be washed in hot water in a range of 60° C. to 100° C. Then, it is preferable that the resulting membrane be dried 60° C. or greater but less than 100° C. for 1 minute to greater but less than 24 hours. When the drying is carried out less than 60° C., time required for drying is too long, and production cost increases, and it is therefore not suitable for industrial production. When the drying is carried out at 100° C. or greater, there is a probability that the membrane shrinks excessively during drying, and fine cracks form in the surface of the membrane.

It is preferable that the membrane after drying be wound on a bobbin or a skein. When the membrane is wound on a skein, element-processing becomes easy.

As explained above, when the first porous layer and the second porous layer are adhered completely, water permeability decreases; therefore, in order to prevent this, it is preferable that before forming the second porous layer, a solution, which does not dissolve the membrane material, be coated on the surface of the first porous layer.

As the solution which does not dissolve the membrane material, an aqueous solution containing solvent used for the membrane forming solution is preferably used. For example, when dimethyl acetamide is used for a solvent of the membrane forming solution, the concentration of dimethyl acetamide in the solution, which does not dissolve the membrane material, is preferably in a range of 1% to 50%. As the other solutions which do not dissolve the membrane material, an organic solvent, a mixture containing an organic solvent and water, and these solutions, which an additive containing glycerol is added as a main component, are preferably used.

Next, the second porous layer is formed by coating the second membrane forming solution on the surface of the first porous layer. It is not necessary to use the first membrane forming solution having lower concentration to form the second porous layer.

When the production method is carried out, for example, a ring nozzle shown in FIG. 1 is preferably used. The ring nozzle comprises 3 members, that is, a divided plate 10, a first divided nozzle 9, which is assembled adjacent to the divided plate 10, and a second divided nozzle 8, which is assembled adjacent to the first divided nozzle 9, and is an edge portion of the ring nozzle.

The divided plate 10 is a disc shaped member, and comprises a conduit 1, in which the braid passes, in the center portion thereof. In addition, the divided plate 10 comprises a first supply port 6 for supplying the first membrane forming solution, and a second supply port 7 for supplying the second membrane forming solution, which are formed around the conduit 1.

The divided nozzle 9 is a member having a cross-sectional shape of substantially a T, and having a disc plane shape. At the center portion, a protrusion pipe portion 13, which protrudes toward the inside of the second divided nozzle 8, is provided. The protrusion pipe portion 13 is hollow, and this hollow portion forms a braid passage 100 by connecting with the conduit 1. When the first divided nozzle 9 and the divided plate 10 are superimposed concentrically, that is, such that the conduit 1 and the protrusion pipe portion 13 are connected, the braid passage 100 is formed at their center.

The first divided nozzle 9 comprises a hollow portion connecting to the first supply port 6 and another hollow portion connecting to the second supply port 7, which are formed around the braid passage 100.

If the first divided nozzle 9 and the divided plate 10 have grooves such that when they are superimposed concentrically, the first solution pool portion 11, which is connected to the first supply port 6, is formed. The first divided nozzle 9 and the divided plate 10 also have a ring-shaped slit such that when they are superimposed concentrically, a first discharge port 2 is formed around the entirety of the wall of the braid passage 100 in a circumferential direction. In addition, the first solution pool portion 11 and the first discharge port 2 are connected.

When the first divided nozzle 9 and the divided plate 10 are superimposed concentrically, and a solution is supplied to the first supply port 6, the solution is stored in the first solution pool portion 11, the solution is discharged toward the braid passage 10 from the first discharge port 2.

The second divided nozzle 8 is also a member having a disc shape, and comprises a second solution pool portion 12 at the center thereof, and a hollow portion connecting to the second solution pool portion 12. This hollow portion connects the second supply port 7, via the hollow portion connecting to the second supply port 7 formed in the first divided nozzle 9. When the first and second divided nozzles 8 and 9 are superimposed concentrically, the second solution pool portion 12 is formed at the circumferential outside of the protrusion pipe portion 13 of the first divided nozzle 9. Specifically, a space, which is formed by the end face of the protrusion pipe portion 13 of the first divided nozzle 9, the protrusion pipe portion 13, and the second divided nozzle 8, is the second solution pool portion 12. The second solution pool portion 12 is formed such that the cross-sectional area thereof decreases toward the end thereof. That is, the inside wall of the second divided nozzle 8 gradually inclines toward the protrusion pipe portion 13.

In addition, the second discharge port 3 is formed at the end of the second solution pool portion 12. That is, the second discharge port 3 is formed by the outer wall at the end of the protrusion pipe port 13 and the inner wall of the second divided nozzle 8.

In particular, it is preferable that the end face of the protrusion pipe portion 13, that is, the end face 100 of the braid passage 100, be positioned inner than the end face 5 of the second discharge port 3, that is, the end face 5 of the second divided nozzle 8.

In other words, it is preferable that the distance 4 (below, this is denoted by liquid seal-length) between the end face of the protrusion pipe portion 13, that is, the end of the braid passage 100, and the end face 5 of the second discharge port 3, that is, the end face 5 of the second divided nozzle 8, be in a range of 0.5 mm to 150 mm. The lower limit of the liquid seal-length is preferably 0.6 mm, and more preferably 0.8 mm. When the liquid seal-length is less than 0.5 mm, the second membrane forming solution, which is coated on the surface of the first porous layer, is discharged almost without coating pressure. Due to this, the second porous layer is formed with a fixed diameter at a position where the first porous layer is formed thinner than other portions, and discharged from the nozzle. As a result, it is probable that a large gap will form between the first porous layer and the second porous layer. From the viewpoint of coating pressure, there is no upper limit of the liquid seal-length, but when it is too long, production of the ring nozzle tends to be difficult. Therefore, the upper limit of the liquid seal-length is preferably 150 mm. The lower limit of the liquid seal-length is preferably 100 mm, and more preferably 50 mm.

When the composite porous membrane of the present invention is used for water treatment, a fixing member made of synthetic resin, for example, is used to divide the first side and the second side. However, when the composite porous membrane has the above-mentioned gap, the resin flow into the gap, and the probability increases that water to be treated does not readily impregnate in the entirety of the composite porous membrane. When the liquid seal-length is adjusted to a suitable value, coating pressure of the discharged membrane forming solution tends to increase. Therefore, it is possible to prevent a large gap being formed between the first porous layer and the second porous layer.

As explained above, when the divided plate 10, the first divided nozzle 9, and second divided nozzle 8 are concentrically superimposed, and a solution is supplied to the second supply port 7, the supplied solution passes through the hollow portion of the first divided nozzle 9, and the hollow portion formed by the first divide nozzle 9 and the second divided nozzle 8, and stored in the second solution pool portion 12. After that, the solution discharged toward the braid passes 100 from the second discharge port 13.

In order to produce the composite porous membrane using the ring nozzle having such a structure, first, the braid is supplied from the conduit 1 to the braid passage 100. The first membrane forming solution is supplied to the first solution pool portion 11 from the first supply port 6. The second membrane forming solution is supplied to the second solution pool portion 12 from the second supply port 7.

While the braid is continuously supplied to the conduit 1, that is, while the braid moves in the braid passage 100, the first membrane forming solution is discharged from the first discharge port 2, and is impregnated into the braid, the second membrane forming solution is discharged from the second discharge port 3 and is impregnated into the braid.

After that, the braid, which the first and second membrane forming solutions are impregnated, as explained, this is immersed in the solidification solution, and then this is water-washed and chemical-washed, and dried, and after that, this is wound.

Next, the solution, which does not dissolve the membrane material, is supplied to the first supply port 6, this is discharged from the first discharged port 2, and coats the surface of the first porous layer.

After that, the second membrane forming solution, which is supplied from the second supply port 7, and stored in the second solution pool portion 12, is discharged and coats the surface of the first porous layer.

The composite porous membrane provided with the membrane material comprising the first porous layer and the second porous layer is explained above. In the present invention, a porous multilayer may be formed on the second porous layer. In this case, the porous multilayer is formed in sequence in a manner identical to that of forming the second porous layer on the first porous layer.

EXAMPLES

Below, the present invention will be explained with reference to experimental examples.

Properties of the composite porous membrane were examined as follows.

"%" used for showing a content and a concentration denotes "% by mass".

<Largest Pore Diameter (μm) (Bubble Point Method)>

The largest pore diameter was measured using ethyl alcohol as a measuring medium by a method defined in JIS K 3832.

<Hot Water Shrinkage>

The length of the braid before and after immersing the braid, which was cut to 1 m, in hot water at 90° C. for 30 minutes, was measured. Then the hot water shrinkage was calculated from the following formula.

Hot water shrinkage (%)=(length of the braid before treatment−length of the braid after treatment)/length of the braid before treatment×100

Experimental Example 1

The first and second membrane forming solutions 1 and 2 having the compositions shown in Table 1 were prepared by using polyvinylidene fluoride A (marketed by Atofina Japan, trade name: KYNAR® 301F), polyvinylidene fluoride B (marketed by Atofina Japan, trade name: KYNAR® 9000LD), polyvinyl pyrolidone (marketed by ISP Ltd., trade name: K-90), and N,N-dimethyl acetamide.

TABLE 1

| Composition | First membrane forming solution | Second membrane forming solution |
| --- | --- | --- |
| Polyvinylidene fluoride A | 3% | 12% |
| Polyvinylidene fluoride B | 2% | 8% |
| Polyvinyl pyrolidone | 2% | 10% |
| N,N-dimethyl acetamide | 93% | 70% |
| Solution temperature | 50° C. | 60° C. |
| Concentration of polyvinylidene fluoride in the solution | 12% | 20% |

A polyester multifilament simple-weave braid (multifilament; total dtex 830/96 filament; 16 spindles) was introduced in the conduit 1 of the ring nozzle shown in FIG. 1, which was heated to 30° C. and has an outer diameter of 2.5 mm and an inner diameter of 2.4 mm. Then, the first membrane forming solution was discharged from the first discharge port 2, and the second membrane forming solution was discharged from the second discharge port 3. The braid coated with the first and second membrane solutions was introduced in a solidification solution at 80° C. containing 5 parts by mass of N,N-dimethyl acetamide and 95% by mass of water to produce the first porous layer to the braid.

After removing solvent in hot water at 98° C. for 1 minute from the braid comprising the first porous layer, the braid was immersed in 50,000 mg/L of sodium hypochlorite solution, washed with hot water at 90° C. for 10 minutes, and this was dried at 90° C. for 10 minutes, and then this was wound using a winder. The degree of fuzz adhered to or embedded in the braid was 1 per 1 m. The hot water shrinkage of the braid was 1%. The tension applied to the braid was 9.8 kPa.

After that, the braid comprising the first porous layer was introduced in the conduit 1 of the ring nozzle shown in FIG. 1, which was heated to 30° C. and has an outer diameter of 2.7 mm and an inner diameter of 2.6 mm. Then, glycerin (marketed by Wako Pure Chemical Industries, Ltd.; High Class) was discharged from the first discharge port 2 as an inner solidification solution, and the second membrane forming solution was discharged from the second discharge port 3. Thereby, the second membrane forming solution coated the first porous layer. The resulting braid was introduced in a solidification solution at 80° C. containing 5 parts by mass of N,N-dimethyl acetamide and 95% by mass of water to produce a composite porous membrane. After removing solvent in hot water at 98° C. for 1 minute from the braid comprising the first porous layer, the braid was immersed in 50,000 mg/L of sodium hypochlorite solution, washed in hot water at 90° C. for 10 minutes, and this was dried at 90° C. for 10 minutes, and then this was wound using a winder.

The outer diameter and the inner diameter of the resulting composite porous membrane was about 2.8 mm and 1.1 mm, the thickness thereof was 900 μm, the thickness of resin layer from the braid to the surface of the composite porous membrane was 400 μm, the bubble point was 150 kPa, the water permeation capacity was 100 m$^3$/m$^2$h/MPa, the bursting pressure by flow was 500 kPa, endurance time of applying pressure of 400 kPa was 1,000 times, and the endurance period of applying pressure of 200 kPa was 2,000 hours.

Experimental Example 2

The composite porous membrane was produced in a manner identical to that of Experimental Example 1, except that after producing the braid comprising the first porous layer, drying and washing were not performed, and that a ring nozzle having an outer diameter of 2.8 mm, an inner diameter of 2.7 mm, and a liquid seal-length of 1.0 mm was used.

The outer diameter and the inner diameter of the resulting composite porous membrane was about 2.8 mm and 1.2 mm, the thickness thereof was 800 μm, the thickness of resin layer from the braid to the surface of the composite porous membrane was 400 μm, the bubble point was 180 kPa, the water permeation capacity was 110 m$^3$/m$^2$/h/MPa, the bursting pressure by flow was 520 kPa, endurance time of applying pressure of 400 kPa was 1,300 times, and the endurance period of applying pressure of 200 kPa was 3,000 hours.

INDUSTRIAL APPLICABILITY

The composite porous membrane of the present invention has superior mechanical properties such as adhesive strength between a braid and a filtration member, to those of the prior composite porous membrane. Therefore, the composite porous membrane can be used in severe conditions such as in many kinds of water treatments, in which it has been thought that filtration and separation is impossible by a membrane method, and improves the quality of filtrate. In addition, since the water permeation capacity is high, membrane area used becomes small, and it is possible to reduce an equipment cost.

In addition, according to the method for producing a composite porous membrane, the composite porous membrane having excellent properties can be easily produced.

The invention claimed is:

1. A composite porous membrane comprising a braid, and a membrane material, wherein
    said membrane material comprises a first porous layer having an inner surface, an outer surface, and a first thickness, and a second porous layer having an inner surface, an outer surface, and a second thickness,
    the first porous layer is arranged on the outer surface of the braid and the second porous layer is arranged on the first porous layer,
    the first porous layer includes a first dense layer with a thickness less than the first thickness and the first dense layer has an average pore diameter in the range of 0.2 µm to 1 µm,
    the second porous layer includes a second dense layer with a thickness less than the second thickness and the second dense layer has an average pore diameter in a range of 0.1 µm to 0.8 µm, and
    at least one of said first and second dense layers is located 0.1 µm to 50 µm inside from the outer surface of its respective porous layer.

2. A composite porous membrane according to claim 1, wherein the average diameter of the pores at outermost position in the first porous layer is in a range of 1 µm to 5 µm, and the average diameter of the pores at outermost position in the second porous layer is in a range of 0.8 µm to 2 µm.

3. A composite porous membrane according to claim 1, wherein the water permeate flow (WF) is 50 $m^3/m^2/h/MPa$ or greater, and the bubble point (BP) is 50 kPa or greater.

4. A composite porous membrane according to claim 1, wherein the bursting pressure by flow is 200 kPa or greater.

5. A composite porous membrane according to claim 1, wherein the endurance period when water successively passes through the composite porous membrane at 200 kPa is 150 hours or greater.

6. A composite porous membrane according to claim 1, wherein the endurance time of applying pressure of 400 kPa to the composite porous membrane repeatedly is 100 or more.

7. A composite porous membrane comprising a braid, and a membrane material, wherein
    the membrane material comprises a first porous layer having an inner surface, an outer surface, and a first thickness, and a second porous layer having an inner surface, an outer surface, and a second thickness;
    the first porous layer is arranged on the outer surface of the braid and the second porous layer is arranged on the first porous layer;
    the first porous layer comprising a first dense layer with a thickness less than the first thickness;
    the second porous layer comprising a second dense layer with a thickness less than the second thickness;
    the first dense layer is located 0.1 µm to 50 µm inside from the outer surface of the first porous layer and the second dense layer is located 0.1 µm to 50 µm inside from the outer surface of the second porous layer; and
    the first dense layer has an average pore diameter in the range of 0.2 µm to 1 µ, and the second dense layer has an average pore diameter in a range of 0.1 µm to 0.8 µm.

8. A composite porous membrane according to claim 7, wherein the average diameter of the pores at outermost position in the first porous layer is in a range of 1 µm to 5 µm, and the average diameter of the pores at outermost position in the second porous layer is in a range of 0.8 µm to 2 µm.

* * * * *